US006847866B2

(12) United States Patent
Gaier

(10) Patent No.: US 6,847,866 B2
(45) Date of Patent: Jan. 25, 2005

(54) SHORTENED AIRCRAFT HOLDING PATTERNS

(75) Inventor: Chad E. Gaier, Glendale, AZ (US)

(73) Assignee: Honeywell International Inc., Morristown, NJ (US)

(*) Notice: Subject to any disclaimer, the term of this patent is extended or adjusted under 35 U.S.C. 154(b) by 58 days.

(21) Appl. No.: 10/325,181

(22) Filed: Dec. 20, 2002

(65) Prior Publication Data

US 2004/0122567 A1 Jun. 24, 2004

(51) Int. Cl.[7] .................. G06F 17/00; G01C 21/00
(52) U.S. Cl. .................. 701/4; 701/120; 244/75 R; 340/945
(58) Field of Search .............. 701/3, 4, 120–122; 244/75 R; 340/945, 951

(56) References Cited

U.S. PATENT DOCUMENTS

| 4,692,869 | A | * | 9/1987 | King et al. ............... 701/206 |
| 5,553,387 | A | * | 9/1996 | Newcomb ................ 33/1 SD |
| 6,167,627 | B1 | | 1/2001 | Wilder et al. |
| 6,246,957 | B1 | * | 6/2001 | Barrer et al. ............ 701/202 |
| 2002/0177943 | A1 | * | 11/2002 | Beardsworth ............ 701/120 |
| 2002/0193915 | A1 | * | 12/2002 | Miller ....................... 701/3 |

FOREIGN PATENT DOCUMENTS

WO    WO02/101686 A    12/2002

OTHER PUBLICATIONS

Panayiotou et al., "A Sample Path Approach for Solving the Ground–Holding Policy Problem in Air Traffic Control", IEEE Transactions on Control Systems Technology, vol. 9, No. 3, May 2001.*

* cited by examiner

Primary Examiner—Michael J. Zanelli
Assistant Examiner—Eric M. Gibson

(57) ABSTRACT

Methods, apparatus and program product are provided to obtain a shortened holding pattern exit path for an aircraft from its current position (CP) in or entering a holding pattern to an allowed exit point (EP) of the holding pattern. The flight management system (FMS) determines which segment of the holding pattern the aircraft is currently on, i.e., A, B, or C defines in terms of the holding pattern turn points (TP1, TP2, TP3, TP4) and the waypoint (SP) which is symmetrical to the desired EP. The FMS compares the aircraft CP with EP and SP location and directs turns at the appropriate waypoints to give the shortest allowed exit pathway. Both Type I and Type II holding pattern entries are accommodated.

18 Claims, 5 Drawing Sheets

SHORTENED AIRCRAFT HOLDING
PATTERNS

FIELD OF THE INVENTION

The present invention generally relates to shortened holding patterns for aircraft, and more particularly relates to providing flight path information for exiting an aircraft flight holding pattern is an abbreviated but legal manner.

BACKGROUND OF THE INVENTION

It is common for aircraft to be required by flight controllers to maintain a racetrack course holding pattern. Regulations well known in the flying art mandate that a pilot enter, fly and exit a racetrack holding pattern in a prescribed manner. These are to insure that mid-air collisions are avoided. FIG. 1 illustrates conventional racetrack flight path holding pattern 10 according to the prior art. Holding pattern 10 is identified by fixed point (FP) 12 having coordinates X, Y, Z where X=latitude or equivalent measure, Y=longitude or equivalent measure and Z=altitude. Thus FP 12 represents a point in space that, according to Federal Aviation Administration (FAA) rules defines a particular location for a holding pattern with compass orientation vector 13 and distance (or time at speed) 21 between turn-points 20, 24 (and 28, 12). Direction 15 is designated as "outbound" and direction 17 is designated as "inbound." FP 12 is also referred to as the first turn-point (TP1). Distance 21 (or time) is the separation between second turn-point (TP2) 20 and third turn-point (TP3) 24 along outbound leg 22, and equivalent distance 21' between fourth turn-point (TP4) 28 and fixed point (FP) 12 along inbound leg 30. (TP2) 20 and (TP3) 24 on outbound leg 22 are symmetrical with respect to (TP1) 12 and (TP4) 28 on inbound leg 30. Overall holding pattern length 23 is the sum of distance 21, 21' plus diameter 19. The holding pattern perimeter is distance 21, 21' plus the sum of the arc lengths of turns 18 and 26.

Often, holding pattern distances are defined in terms of time at a given speed. Thus, "distance" and "time" are used interchangeably herein to express separations between points in space, it being understood that "time" means time-at-known-speed. It is expected that the aircraft will complete a circuit around the holding pattern in a specified time. Similarly, turn diameter 19 usually results from a "standard rate" turn and thus has a predictable diameter and arc length, but other types of turns can also be used whose diameter and arc length depend on the aircraft characteristics. Such matters are well known in the art. As used herein the words "turn" and "standard rate turn" are intended to include any type of turn.

In the example of FIG. 1, aircraft 14 enters holding pattern 10 on entry path 16 passing through FP 12. This is referred to as a Type II entry because it occurs within angle 27 formed by line 11 and base vector 13 or equivalently, as shown here, between line 11 and inbound leg 30. Angle 27 is 110 degrees and complementary angle 25 is 70 degrees with respect to vector 13. If the entry path lies within angle 25 it is referred to as a Type I entry. Regulation holding pattern entries must lie within angles 25 or 27.

As aircraft 14 passes through FP, (TP1) 12, it rolls onto first turn 18 headed for (TP2). When aircraft 14 completes first turn 18 at second turn-point (TP2) 20, it rolls out onto outbound leg 22 parallel to holding pattern vector 13. Aircraft 14 continues on outbound leg 22 to third point (TP3) 24 where it executes second turn 26 leading to fourth turn-point (TP4) 28 where it rolls back onto inbound leg 30 back toward FP 12, which is also the first turn-point (TP1). The sequence shown by 18, 20, 22, 24, 26, 28, 30, 12 is repeated as long as aircraft 14 remains in holding pattern 10. Historically when the local Air Traffic Control (ATC) released aircraft 14 from holding pattern 10, aircraft 14 proceeded to FP 12 and turned onto exit path 32 originating at FP 12, heading toward waypoint 34 and its next destination, as for example, the local airport landing pattern or another location designated by the ATC.

Nearly all large aircraft have an avionics suite that includes a Flight Management System (FMS) for navigation and other functions and an Autopilot that actually flies the aircraft under the direction of the FMS. Based on navigation and destination information provided by the crew either by manual input or from computer data files, the FMS determines the optimal course and direction to execute various turns and pass through designated waypoints and the Autopilot (AP) issues electronic and/or hydraulic commands to flight surface actuators to steer the plane along the course provided the FMS. The FMS uses a combination of crew inputs, stored information and GPS (or equivalent) aircraft position data to generate steering commands for the AP. Means and methods for doing this are well known in the art. Such systems are commercially available.

Often, holding pattern 10 is flown on autopilot. The aircraft is guided by the Flight Management System (FMS) that keeps track of the aircraft's present position and the holding pattern flight path. Stored in the memory of the FMS is information on the aircraft's flight characteristics, such as for example, its safe turning rate and diameter, rate of climb and descent, and so forth. In general the aircraft flight plan and information on many holding patterns are also stored in the FMS or on computer memory disks that the FMS can access.

Once the FMS is instructed to "Hold" at FP 12 it looks up or calculates each of the successive turn points 12, 20, 24, 28 and provides instructions to the autopilot to execute the required maneuvers to enter holding pattern 10 and keep the aircraft in holding pattern 10 until an "Exit Hold" instruction is received (abbreviated herein as "EH"). When the pilot or navigator toggles or actuates the "Exit Hold" button or command the FMS automatically issues instructions to the autopilot to direct the airplane through FP 12 onto path 32 toward new waypoint 34 and its next destination. Means and methods for determining aircraft location and performing such calculations and maneuvers are well known in the art. Alternatively, if the AP is not being used and the pilot is actively flying the aircraft, the FMS can provides the pilot with information on when a given turning point is reached and the required course change, that is, the FMS can lead the pilot around the holding pattern and informs him or her when and how to exit.

Historically the FAA required that aircraft 14 pass through FP 12 on entering and exiting holding pattern 10 and that it enter within angels 25, 27 and exit along path 32. This has the disadvantage that if the aircraft, for example, is on turn-one 18 when the depart or exit holding pattern message is received from the ATC and the "Exit Hold" (EH) command given to the FMS, the aircraft must still fly the entire sequence 18, 20, 22, 24, 26, 28, 20 back to FP 12 before it can exit holding pattern 10. Further, even if the aircraft is on inbound leg 30, being constrained to exit along path 32 through FP 12 can require additional distance and time. Additionally the limitation that entry into holding pattern 32 must be through FP 12 can also require additional time and flight distance. These limitations all waste time and fuel. The FAA has now relaxed these requirements for certain types of holding patterns designated, for example, as Types HA or HM.

Accordingly, an improved means and method is needed for the aircraft FMS to determine an exit pattern using the least time and distance depending upon where the aircraft is in the holding pattern when the "Exit Hold" (EH) command is given and consistent with flight safety. In addition, different entrance paths and circumstances need to be accommodated. Further, it is desirable that the aircraft's performance characteristics be taken into account. Other desirable features and characteristics of the present invention will become apparent from the subsequent detailed description of the invention and the appended claims, taken in conjunction with the accompanying drawings and this background of the invention.

BRIEF SUMMARY OF THE INVENTION

A program method is provided for controlling or directing an aircraft on an allowed shortened holding pattern exit path from its current position (CP) in a holding pattern, to reach an allowed exit point (EP) from the holding pattern. The holding pattern comprises inbound and outbound legs, a near turn leading from a first turning point (TP1) at an inward end of the inbound leg to a second turning point (TP2) at an inward end of the outbound leg and a far turn leading from a third turning point (TP3) at an outward end of the outbound leg to a fourth turning point (TP4) at an outward end of the inbound leg and where the (EP) lies on the inbound leg and a symmetrical point (SP) lies opposite and symmetrical to the (EP) on the outbound leg.

When an "Exit Hold" occurs, a flight management system (FMS) preferably on the aircraft determines which holding pattern segment A, B, or C the plane is currently on, where segment A is between (TP3) and the (EP), segment B is between the (EP) and the (SP) and segment C is between the (SP) and (TP3). If the aircraft is currently on segment A, then the FMS directs the aircraft along the holding pattern to reach the (EP). If the aircraft is on segment B, then the FMS directs the aircraft along the holding pattern to the (SP) and at the (SP) directs a turn toward the inbound leg to substantially directly reach the (EP). If the aircraft is on segment C, then the FMS determines the shortest distance D along the holding pattern from the (SP) to the (CP), directs a turn to the inbound leg, then a roll-out along the inbound leg and then further travel for reciprocal distance −D to reach the (EP). At the (EP) the FMS directs a turn to the desired departure path. In the preferred embodiment, the FMS increments or decrements the distances flown to or from the turns to compensate for the flight control response lag so that the aircraft arrives at the desired waypoints. When an aircraft is entering the holding pattern, the entering aircraft may roll out onto the outbound leg vector on an extension to the outbound leg. This extension is considered part of segment B for purposes of determining a shortened exit path.

In a further embodiment, the following steps are executed prior to determining what segment the aircraft is on: determining whether the aircraft is on an entry path into the holding pattern or already in the holding pattern, and if on an entry path, then determining a first tangent point where the entry path tangentially intersects a first circle, the first circle being tangent to the outbound leg at a second tangent point; then at the first tangent point, directing a turn onto the first circle toward the outbound leg; and at the second tangent point, directing a roll-out onto a path on or extending from the outbound leg of the holding pattern thereby bringing the aircraft into the holding pattern.

In a further embodiment, when the aircraft is entering the holding pattern, the method determines whether the entry path is a Type I or a Type II entry path and calculates circle intersection tangent points and circle roll-out tangent points appropriate to Type-I or Type-II entries so as to bring the aircraft into the holding pattern along the outbound leg.

An apparatus is provided for directing an aircraft along a shortened exit from a holding pattern, said apparatus comprising: a processor, memory coupled to the processor, a display and command unit coupled to the process for coupling commands received from the operator to the processor and indicating suggested course changes generated by the processor or an autopilot coupled to the processor for actuating aircraft control surfaces in response to directions from the processor so as to produce course changes, or both; a program method residing in memory and executed by the processor for rendering suggested course changes on the display or commanding the autopilot to turn the aircraft or both, in response to an "Exit Hold" command received from the user, wherein the program method is as previously recited herein above.

A program product is also provided, the program product comprising a program method for providing an allowed shortened holding pattern exit path for an aircraft, wherein said program method is as recited above, and signal bearing media bearing said program method.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

Figure 1:
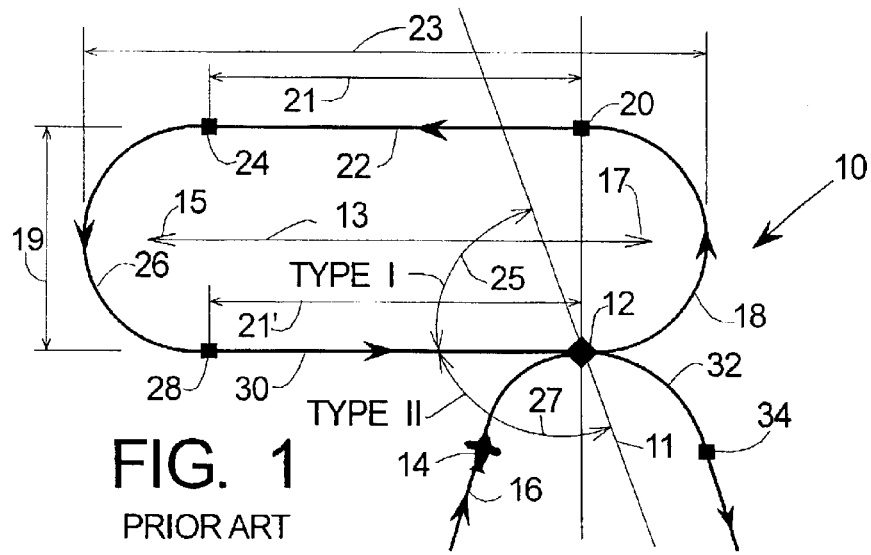
FIG. 1 is a simplified schematic diagram of a flight path holding pattern for an aircraft, according to the prior art.

The following detailed description of the invention is merely exemplary in nature and is not intended to limit the invention or the application and uses of the invention. Furthermore, there is no intention to be bound by any theory presented in the preceding background of the invention or the following detailed description of the invention. For convenience of explanation, all holding patterns illustrated herein are left-turn racetrack type holding patterns, but this is merely for convenience of explanation and not intended to be limiting. Persons of skill in the art will understand that the present invention applies to right and left hand turn, figure eight, racetrack and other types of holding patterns. Distances between various points on the holding patter (HP) are measured along the holding pattern since they represent distances that the aircraft should travel. Distances between the centers of various circles tangent to the holding pattern, are measured in a direction parallel to the major axis of the holding pattern.

As used herein, the words "direct" or "directing" or equivalent in connection with outputs of the FMS, as for example (but not limited to) in "direct a turn" or "directing a turn," are intended to include both course change (or not change) commands issued to the auto-pilot and course change instructions or suggestions presented to the pilot on a navigation display in the cockpit, or any combination thereof. Further, the words "exit point" and "departure point" (abbreviated as "EP") are used interchangeably with reference to the waypoint where a turn out of the holding pattern is made. As used herein, the words "symmetrical" or "symmetrical point" or "symmetry point" (abbreviated as "SP") refer to corresponding locations on opposite legs of the holding pattern. Thus, (TP1) 12 and (TP2) 20 are symmetrical as are (TP3) 24 and (TP4) 28. Similarly, in FIGS. 2–4, point 48' located on outbound leg 22 at distance 49' from (TP2) 20 is symmetrical to exit point 48 on inbound leg 30 at distance 49 from (TP1) and point 58 located on outbound leg 22 at distance 55' from (TP2) 20 is symmetrical to point 58' on inbound leg 30 at distance 55' from (TP1), and distances. References to a flight management system, abbreviated as FMS, in connection with FIGS. 2–6 are intended to refer to system 200 of FIG. 7. The abbreviation "CP" stands for "current position."

Figure 2:
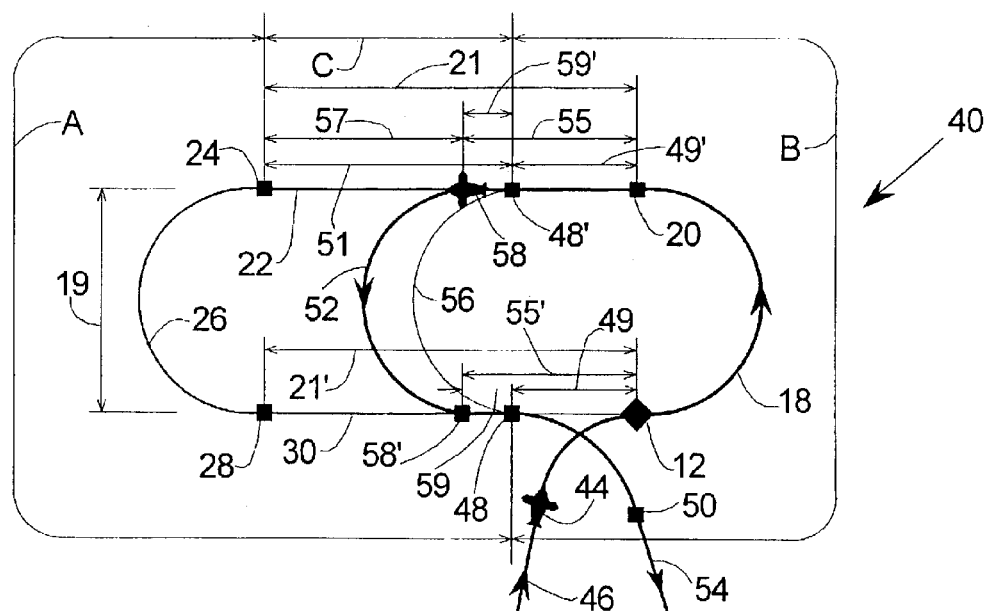
FIG. 2 is a simplified schematic diagram similar to FIG. 1 of a flight path holding pattern for an aircraft, but according to a first embodiment of the present invention.

FIG. 2 is a simplified schematic diagram similar to FIG. 1 of flight path holding pattern 40, but according to a first embodiment of the present invention. Aircraft 44 enters holding pattern 40 along path 46 through fixed point (FP) 12, also referred to as the first turning point (TP1). In this configuration aircraft 44 is said to be active on a Direct Type II Entry (DT2E). As long as aircraft 44 is in holding pattern 40 it follows the path: (TP1, FP) 12, turn 18, (FP2) 20, outbound leg 22, (TP3) 24, turn 26, (TP4) 28, and inbound leg 30 back to (TP1, FP) 12. Under the modified FAA rules, aircraft 44 may exit holding pattern 40 via departure or exit point 48 at offset distance 49 from FP 12, substantially anywhere along inbound leg 30. The location of departure point 48 and the magnitude of offset distance 49 depend upon exit path 54 and/or waypoint 50 and the turning radius of the aircraft.

As will be presently explained, aircraft 44 may roll onto turn 56, 52 or 26 to reach departure point 48 depending on where aircraft 44 is located when the "Exit Hold" (EH) occurs. In FIG. 2 aircraft 44 is shown beginning a shortened exit path at point 58 to arrive at symmetrical point 58' at distance 59 from departure or exit point 48, but this is merely for purposes of illustration. There are several cases to be considered.

First, consider the situation when aircraft 44 is in holding pattern segment A, that is, at least at (TP3) 24 entering second turn 19 or on inbound leg 30 and before departure point 48. In this situation, a shortened exit path is not possible and aircraft 44 is directed along its regular holding pattern track until it reaches exit point 48 where it turns onto exit path 54 through waypoint 50.

Second, consider the situation when "Exit Hold" (EH) occurs while aircraft 44 is in holding pattern segment B, that is either beyond departure point 48 on inbound leg 30 approaching FP 12 or on turn 18 or on outbound leg 22 prior to reaching symmetrical point 48' at distance 49' from (TP2) 20. Distance 49' is substantially equal to offset distance 49. Shortened exit path 56, 54 can be used, originating at symmetrical point 48'. Aircraft 44 completes turn 18, passes through (TP2) 20 and continues along outbound leg 22 substantially for distance 49'. When aircraft 44 reaches location 48' at distance 49' from (TP2) 20, then turn 56 is executed to bring aircraft 44 directly to departure point 48, at distance 49 from FP 12. This is the minimum travel distance and time to bring aircraft 44 to departure or exit point 48.

At departure or exit point 48, the FMS directs a turn onto exit path 54 through waypoint 50. Departure or exit point offset distance 49 can vary according to desired flight path 54 and the location of waypoint 50 and any further destination. Given the location of waypoint 50 or exit path 54, then departure or exit point offset distance 49 is determined from the aircraft characteristics and speed which in turn determine the lead distance required to have a standard rate turn (or other turn) bring aircraft 44 from point 48 to point 50 and onto path 54. The departure distance is shortened by two times distance 51, that is, two times the difference of distance 21, 21' less distance 49, 49' (or equivalent time). Persons of skill in the art will understand that distance pairs 21, 21'; 49, 49'; 55, 55'; 57, 57' are substantially equal within the normal flight path errors, and that waypoints 12, 20; 24, 28; 48, 48'; and 58, 58' occupy substantially symmetrical positions around the holding pattern, again within normal flight path position errors. This is also true of analogous distances and symmetrical waypoints in subsequent figures.

Third, consider the situation when aircraft 44 is on holding pattern segment C, that is, outbound somewhere on segment 22 between symmetrical point 48' and (TP3) 24, as for example, at point 58. If "Exit Hold" (EH) occurs while aircraft 44 is in this position, shortened exit path 52, 54 can be used. The FMS determines where (or when) to begin turn 52 so that aircraft 44 will end up at location 58' at distance 59 from departure point 48. Location 58' is substantially at distance 55' from FP 12 where distance 55' is greater than offset distance 49 from departure point 48 to fixed point 12. Thus, the FMS system initiates turn 52 at distance 55, 55' from (FP, TP1) 12 and (TP2) 20 to bring aircraft 44 to location 58'. At location 58', aircraft 44 rolls out onto inbound leg 30 and proceeds to departure or exit point 48. The exit distance (or time) is shortened, compared to the prior art, by twice distance 57, that is, twice the difference of distance 21, 21' less distance 55, 55' (or equivalent times). As explained below, distance 55, 55' include any compensation required to accommodate the response or lag time of the particular aircraft.

Persons of skill in the art will understand that it takes the aircraft a finite amount of time (or distance) to respond to pilot or autopilot actions. The FMS takes this into account, issuing a course change command or indication sufficiently ahead so that the aircraft course change will actually occur at the desired turn-point. Thus, as used herein, when reference is made to turns or other maneuvers occurring at certain distances from various points or locations, such distances are intended to include whatever increment or decrement is required to compensate for the lag in aircraft response. Ordinarily, this can be accomplished automatically by the FMS.

Figure 3:
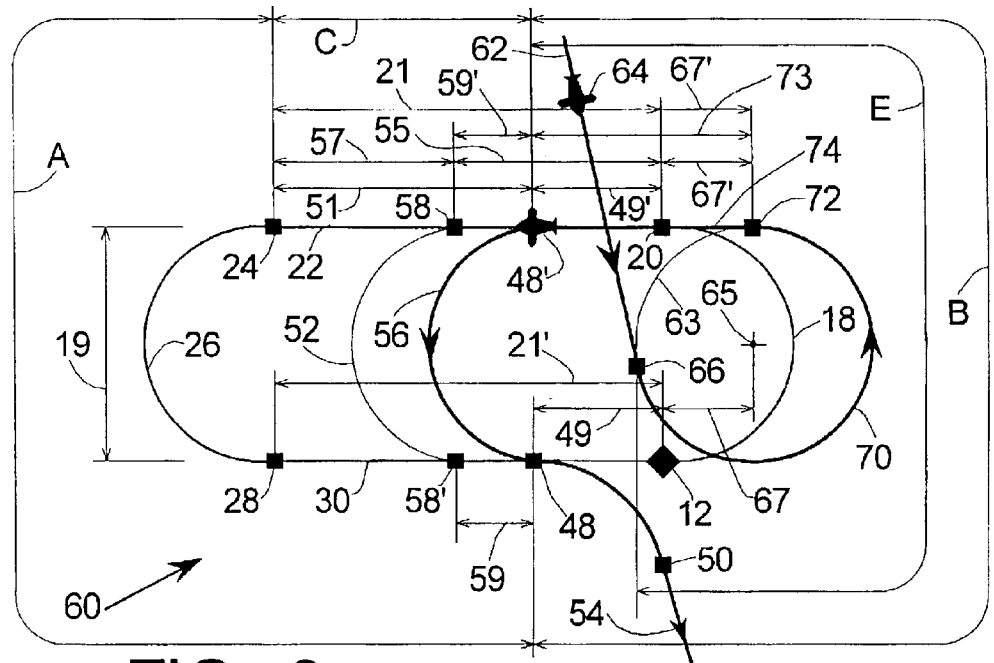
FIG. 3 is a simplified schematic diagram similar to FIG. 1 of a flight path holding pattern for an aircraft, but according to a further embodiment of the present invention for another entrance path.

FIG. 3 is a simplified schematic diagram similar to FIG. 1 of flight path holding pattern 60 for aircraft 64, but according to a further embodiment of the present invention for different entrance path 62 that does not pass through FP 12. Entrance path 62 is a Type I entrance path. As will be presently explained, once aircraft 64 is in holding pattern 60 it may roll onto turn 56, 52 or 26 to reach departure or exit point 48 depending on where aircraft 64 is located when "Exit Hold" (EH) occurs. In FIG. 3 aircraft 64 is shown beginning a shortened exit path at point 48' symmetrical to departure point 48, but this is merely for purposes of illustration.

Circle 63 of diameter 19 and center 65 is tangent to extension 74 of outbound leg 22 at tangent point two, abbreviated as (TAN2). (TAN2) is located at point 72 in FIG. 3. Circle 63 has its center 65 located at inbound distance 67 from FP 12. This is referred to as the "outbound tangent turning circle." The FMS determines location 66 where (or when) flight path 62 becomes tangent to circle 63. This is referred to as tangent point one and abbreviated as TAN1. At (TAN1) 66, the FMS directs a turn onto circle 63 so as to cause aircraft 64 to execute turn 70 to arrive at (TAN2) 72 where it rolls out onto outbound leg 74, 22. Aircraft 64 then follows the sequence (TP3) 24, turn 26, (TP4) 28, inbound leg 30, (TP1,FP) 12, turn 18, (TP2) 20, outbound leg 22, etc., to maintain holding pattern 60. When "Exit Hold" (EH) is received, several cases need to be considered depending upon the location of aircraft 64 in holding pattern 60.

First, consider the situation when aircraft 64 is in holding pattern segment A, that is, at least past (TP3) 24 on second turn 26 or inbound leg 30 but before departure point 48. When "Exit Hold" (EH) occurs in this situation, a shortened exit path is not possible and aircraft 64 is directed along its regular holding pattern track (turn 26, (TP4), inbound leg 30, etc.) until it reaches exit point 48 where it turns onto exit path 54 through waypoint 50.

Second, consider the situation when "Exit Hold" (EH) occurs while aircraft 64 is in holding pattern segment B, that is, beyond departure or exit point 48 on inbound leg 30 approaching FP 12 or on turn 18 or on outbound leg 22 but before symmetrical point 48' opposite departure point 48. Shortened exit path 56, 54 can be used and is determined in the same manner as with aircraft 44 for the second case (segment B) described in connection with FIG. 2 above. The distance saved is twice distance 51 or equivalent time. As noted previously about distances to a turn point, distance 51 takes into account any increment or decrement needed to accommodate the aircraft's control response lag.

Third, consider the situation when aircraft 64 is in segment C of holding pattern 60 outbound somewhere on segment 22 between (TP2) 20 and (TP3) 24. If "Exit Hold" (EH) occurs while aircraft 64 is in segment C, for example at point 58 at distance 55 from exit point (TP2) 20, then shortened exit path 52, 54 can be used in the same manner and under the same conditions as for aircraft 44 in segment C, case three, described above in connection with FIG. 2. The distance saved is twice the distance 57 or equivalent time. As noted previously about distances to a turn point, distance 55 takes into account any increment or decrement needed to accommodate the aircraft controls' response lag.

Fourth, consider the situation when "Exit Hold" occurs while aircraft 64 is in segment E of holding pattern 60, that is, it has just entered holding pattern 60 at tangent point (TAN1) 66 or beyond but before exit symmetrical point 48'. In this situation aircraft 64 enters turn 70 to tangent point (TAN2) 72 where it rolls out onto outbound leg 74, 22 and flies to location 48' at distance 73 from (TAN2) 72, where distance 73 substantially equals the sum of incoming off-set distance 67, 67' between center 65 of circle 63 and FP 12, plus outgoing offset distance 49, 49' between FP 12 and departure point 48 (or between (TP2) 20 and symmetrical point 48'). In this case, turn 56 is initiated at location 48' so as to bring aircraft 64 directly to departure point 48 where it turns onto departure path 54. This provides the minimum time and distance to exit holding pattern 60 under these conditions and saves twice distance 51 or equivalent time. As noted previously about distances to a turn point, distance 73 takes into account any increment or decrement needed to accommodate the aircraft's control response lag.

Figure 4:
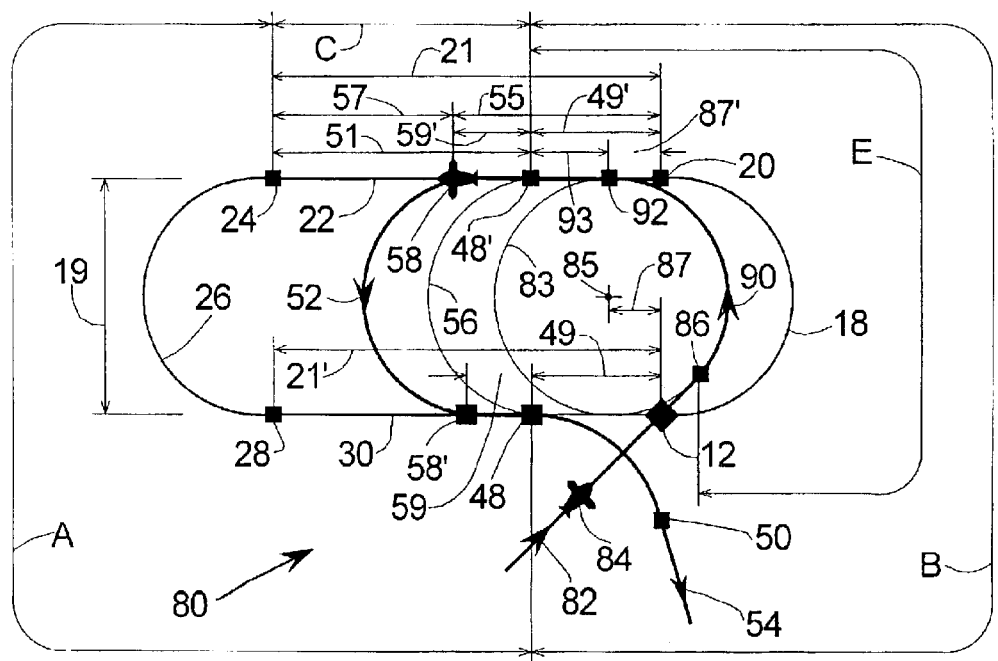
FIG. 4 is a simplified schematic diagram similar to FIG. 1 of a flight path holding pattern for an aircraft, but according to a still further embodiment of the present invention for an additional entrance path.

FIG. 4 is a simplified schematic diagram similar to FIG. 1 of flight path holding pattern 80 for aircraft 84, but according to a still further embodiment of the present invention for different entrance path 82. Entrance path 82 is a Type II entrance path (see FIG. 1). It is assumed for convenience of explanation that entrance path 82 passes through FP 12 but this is not essential. As will be presently explained, aircraft 84 may roll onto turn 56, 52 or 26 to reach departure point 48 depending on where aircraft 84 is located when "Exit Hold" (EH) occurs. In FIG. 4 aircraft 84 is shown beginning shortened exit path turn 52 at point 58, but this is merely for purposes of illustration.

Circle 83 of diameter 19 and center 85 is tangent to outbound leg 22 at tangent point (TAN4) 92 and has its center 85 located at outbound distance 87 from FP 12. The FMS determines location (TAN3) 86 where (or when) flight path 82 will become tangent to circle 83 and directs a turn onto circle 83 so as to cause aircraft 84 to execute turn 90 to arrive at (TAN4) 92 where it rolls out onto outbound leg 22. Aircraft 84 then follows the sequence (TP3) 24, turn 26, (TP4) 28, inbound leg 30, (TP1/FP) 12, turn 18, (TP2-2) 20, outbound leg 22, etc., to maintain holding pattern 80. When "Exit Hold" is received, several cases need to be considered depending upon the location of aircraft 84 in holding pattern 80.

First, consider the situation where aircraft 84 is in holding pattern segment A, that is, at least past (TP3) 24 on second turn 26 or inbound leg 30 but before departure point 48. When "Exit Hold" occurs in this situation, a shortened exit path is not possible and aircraft 84 is directed along its regular holding pattern track until it reaches departure point 48 where it is turned onto exit path 54 through waypoint 50.

Second, consider the situation when "Exit Hold" occurs while aircraft 84 is in holding pattern segment B, that is, beyond departure point 48 on inbound leg 30 approaching FP 12 or on turn 18 or on outbound leg 22 before symmetrical point 48' opposite departure point 48. Shortened exit path 56, 54 is determined in the same manner as with aircraft 44 for the second case (segment B) described above in connection with FIG. 2. The saving is twice distance 51 or equivalent time.

Third, consider the situation when aircraft 84 is in segment C of holding pattern 80 somewhere on segment 22 between exit symmetrical point 48' and (TP3) 24, for example, at point 58. If "Exit Hold" occurs while aircraft 84 is in this position, shortened exit path 52, 54 can be used in the same manner and under the same conditions as for aircraft 44 in segment C, case three, described above in connection with FIG. 2. Aircraft 84 begins its turn to make a shortened exit at point 58, arrives at symmetrical point 58', travels inbound by distance 79 to departure point 48 and turns onto departure path 54 through waypoint 50. The distance saved is twice the distance 57 or equivalent time.

Fourth, consider the situation when "Exit Hold" occurs while aircraft 84 is in segment E of holding pattern 80, that is, it has just entered holding pattern 80 and is at tangent point (TAN3) 86 or beyond but before exit symmetrical point 48'. In this situation aircraft 84 enters turn 90 to tangent point (TAN4) 92 where it rolls out onto outbound leg 22 and flies to location 48' at distance 93 from (TAN4) 92, where distance 93 is less than exit or departure offset distance 49, 49' by distance 87'. Turn 56 is initiated at location 48' so as to bring aircraft 84 directly to departure point 48. This provides the minimum time and distance to exit holding pattern 80 under these conditions and saves twice distance 511 or equivalent time. As noted previously about distances to a turn point, distance 93 (and others) takes into account any increment or decrement needed to accommodate the aircraft's control response lag.

Figure 5:
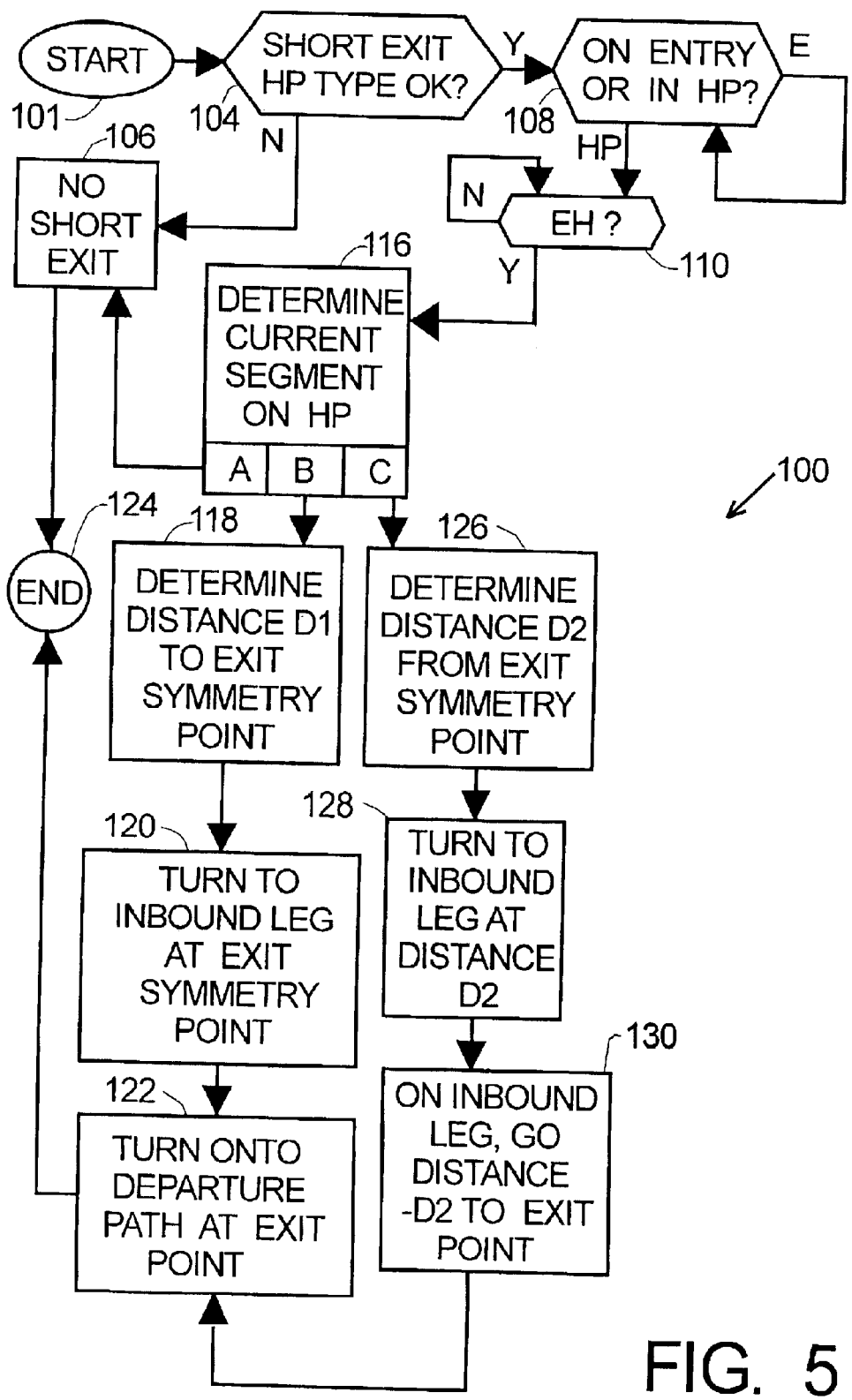
FIG. 5 is a simplified flow chart illustrating the method of the present invention according to a first embodiment.

FIG. 5 shows simplified flow chart 100 illustrating the method of the present invention according to a first embodiment. From START 102, query 104 is carried out by FMS 200 (see FIG. 6) to determine whether or not the holding pattern (abbreviated "HP") is a type for which a shortened exit is permitted, as for example, types HA or HM. If the response to query 104 in NO (FALSE), then no short exit is permitted and the process proceeds to block 106 and END 124. If the response to query 104 is YES (TRUE) then in query 108 it is determined whether or not the aircraft is already in a holding pattern (i.e., "HP") or entering a holding pattern (i.e., "E"). If the response to query 108 is "E" then the process loops back on query 108 until HP is obtained. When the response to query 108 is "HP", that is, the aircraft is in the holding pattern, then process 100 executes query 110 to determine whether an "Exit Hold" has occurred (abbreviated "EH ?"), that is, has a command or release been given directing the aircraft to exit the holding pattern. If the outcome of query 110 is NO (FALSE) then the process loops back to query 110 until a YES (TRUE) is obtained, whereupon block 116 is executed. In the embodiment of FIG. 5, an aircraft on segment E of FIGS. 3–4, i.e., entering the holding pattern, is treated as being on segment B, since the nearest location at which the aircraft can begin a shortened exit maneuver is exit symmetry point 48', the same as for an aircraft already in the holding pattern on segment B.

In block 116, using information from, for example, a GPS or equivalent position locator in navigation subsystem 224 (See FIG. 7) and information about the HP stored in memory 206 of FMS 200 or entered by the pilot, FMS 200 (see FIG. 7) determines the HP segment on which the aircraft is currently located. There are three possible HP segments in which the aircraft can be located: segments A, B, or C (see FIGS. 2–4). When the aircraft is in segment A, a shortened exit is not feasible and process 100 proceeds to "No Short Exit" block 106 and END 124.

When the aircraft is in HP segment B, then process 100 proceeds to block 118 where FMS 200 determines the distance D1 along the holding pattern pathway from the current aircraft position to exit symmetry point 48'. The FMS directs the aircraft along the HP pathway until it reaches exit symmetry point 48' whereupon in block 120 the aircraft is turned along path 56 to inbound leg 30 (e.g., using autopilot subsystem 222 of FIG. 7) to arrive at exit or departure point 48 (see FIGS. 2–4). Then in block 122 of FIG. 5, FMS 200 directs that the aircraft turn onto departure path 54 and process 100 is complete at END 124, for this circumstance.

When the aircraft is in HP segment C, for example at point 58 in FIGS. 2–4, then process 100 advances to block 126 where the distance D2 from exit symmetry point 48' to current aircraft position 58 is determined by the FMS 200. In FIGS. 2–4, distance D2 corresponds to distance 59, 59'. In block 128, FMS 200 directs a turn onto path 52 at distance D2 from symmetrical point 48', heading toward symmetrical point 58' on inbound leg 30. In block 130, FMS 200 directs the aircraft to proceed for distance D2 in a reciprocal direction (i.e., –D2) along inbound leg 30 to exit point 48. In block 122, FMS 200 directs the aircraft to turn onto departure path 54 at exit point 48 and process 100 is complete at END 124 for this circumstance.

As previously noted, distances, e.g., D1, D2 desirably incorporate the aircraft's control response lag. For example, in segment C, the aircraft can carry out the EH as soon as it occurs since it is already in a segment where a shortened exit is possible. It does not have to wait until it reaches exit symmetry point 48' as in segment B. Thus, distance D2 takes into account the delay expected for the aircraft response lag, that is, the difference in time and distance from when the control surfaces are directed to change orientation by FMS 200 (e.g., by autopilot 222 or the pilot) and when the aircraft actually begins to roll onto path 52. This lag time (or distance) depends on the flight properties of the particular aircraft that are stored in memory 206 of FMS 299 and is taken into account by FMS 200 in determining D2. In this way when the aircraft flies on a reciprocal heading on inbound leg 30 for distance –D2 from symmetry point 58, the aircraft will arrive substantially at exit point 48.

Figure 6:
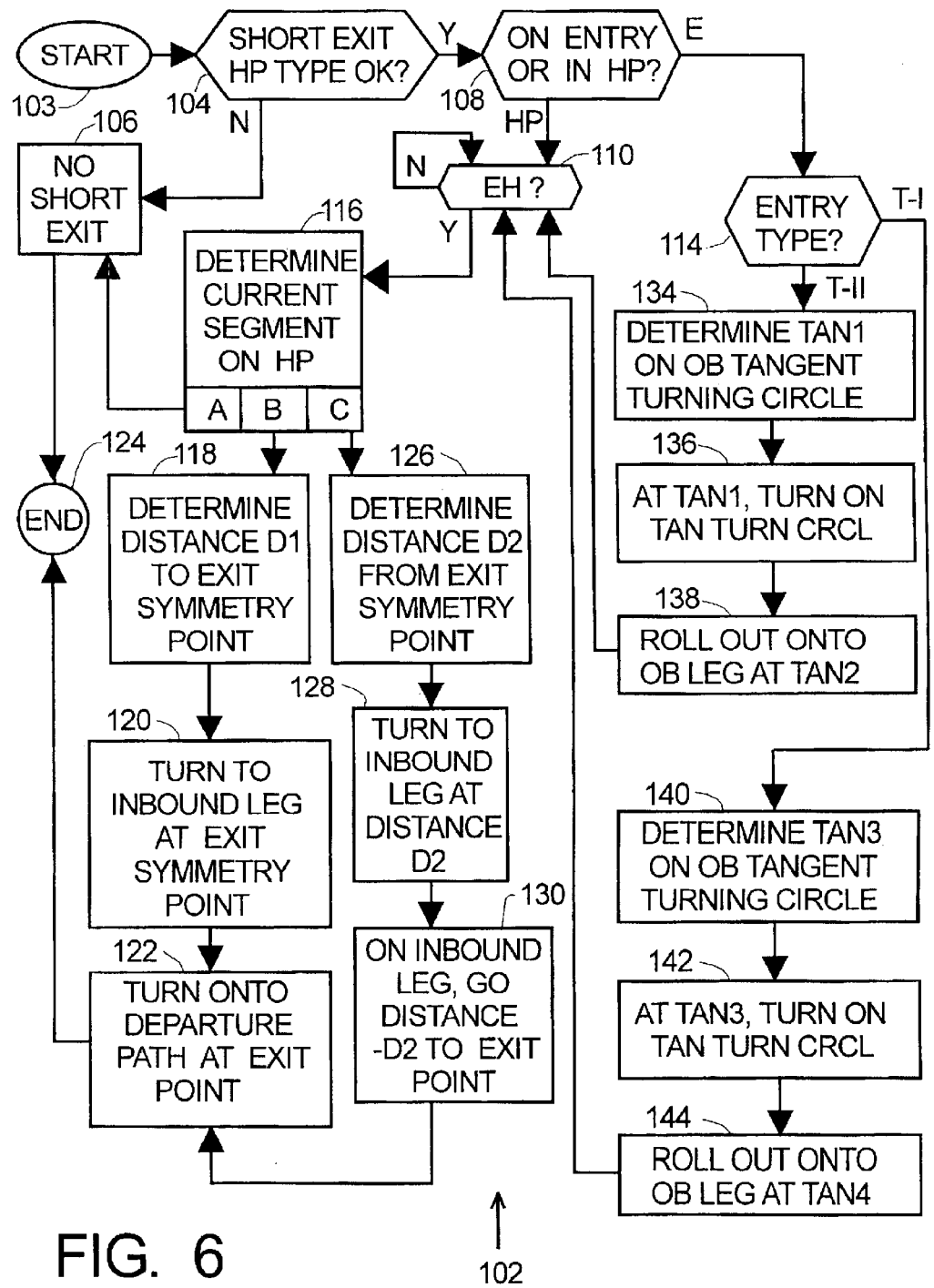
FIG. 6 is a simplified flow chart illustrating the method of the present invention according to a further embodiment.

FIG. 6 is a simplified flow chart illustrating method 102 of the present invention according to a further embodiment, showing how the entry maneuvers illustrated in FIGS. 3–4 are accommodated. Blocks or queries 104–130 of FIG. 6 perform the same functions as similarly numbered blocks or queries in FIG. 5.

Referring now to query 108 in FIG. 6, if the outcome of query 108 is "E", meaning that the aircraft is entering the HP, then process 102 executes query 114 to determine the type of entry, i.e., Type I (abbreviated as T-I) or Type II (abbreviated as T-II), as previously discussed in connection with FIG. 1. If the result of query 114 is T-11, then in block 134 FMS 200 calculates the tangent point (TAN1) to outbound (OB) tangent turning circle 83 (see FIG. 4) that will be intercepted by path 82 of the entering aircraft. For example, in FIG. 4, incoming flight path 82 intersects tangent circle 83 at tangent point 86, designated as (TAN1). Outbound (OB) tangent circle 83 is tangent to outbound leg 22 at tangent point 92, designated as (TAN2). In block 136, FMS 200 directs the aircraft to turn onto this tangent turning circle (e.g., circle 83 and arc 90 in FIG. 4). The aircraft proceeds along this circle until it reaches (TAN2) where this circle is tangent to outbound (OB) leg 22 and in step 138 rolls out onto out bound leg 22 at TAN2. The process now proceeds to EH query 110 where the method follows the same procedure as for an aircraft already in the holding pattern.

If the outcome of query 114 is T-I, then in block 140 FMS 200 calculates the tangent point (TAN3) to outbound (OB) tangent turning circle 63 (see FIG. 3) that will be intercepted by path 62 of the entering aircraft. For example, in FIG. 3, incoming flight path 62 intersects tangent circle 63 at tangent point 66, designated as (TAN3). Outbound (OB) tangent circle 63 is tangent to outbound leg 22 or extension 74 thereto at tangent point 72, designated as (TAN4). In block 142, FMS 200 directs the aircraft to turn onto this tangent turning circle (e.g., circle 63 and arc 70 in FIG. 3). The aircraft proceeds along this circle until it reaches (TAN4) where this circle is tangent to outbound (OB) leg 22 or extension 74. Extension 74 of outbound leg 22 is considered to be a part of outbound leg 22. In step 144, the aircraft rolls out onto outbound (OB) leg 22, 74 at (TAN4) 72. Once on outbound leg 22, 74, the method advances to query 110 and follows the same process as for an aircraft already in the holding pattern as previously described in connection with FIG. 5.

Figure 7:
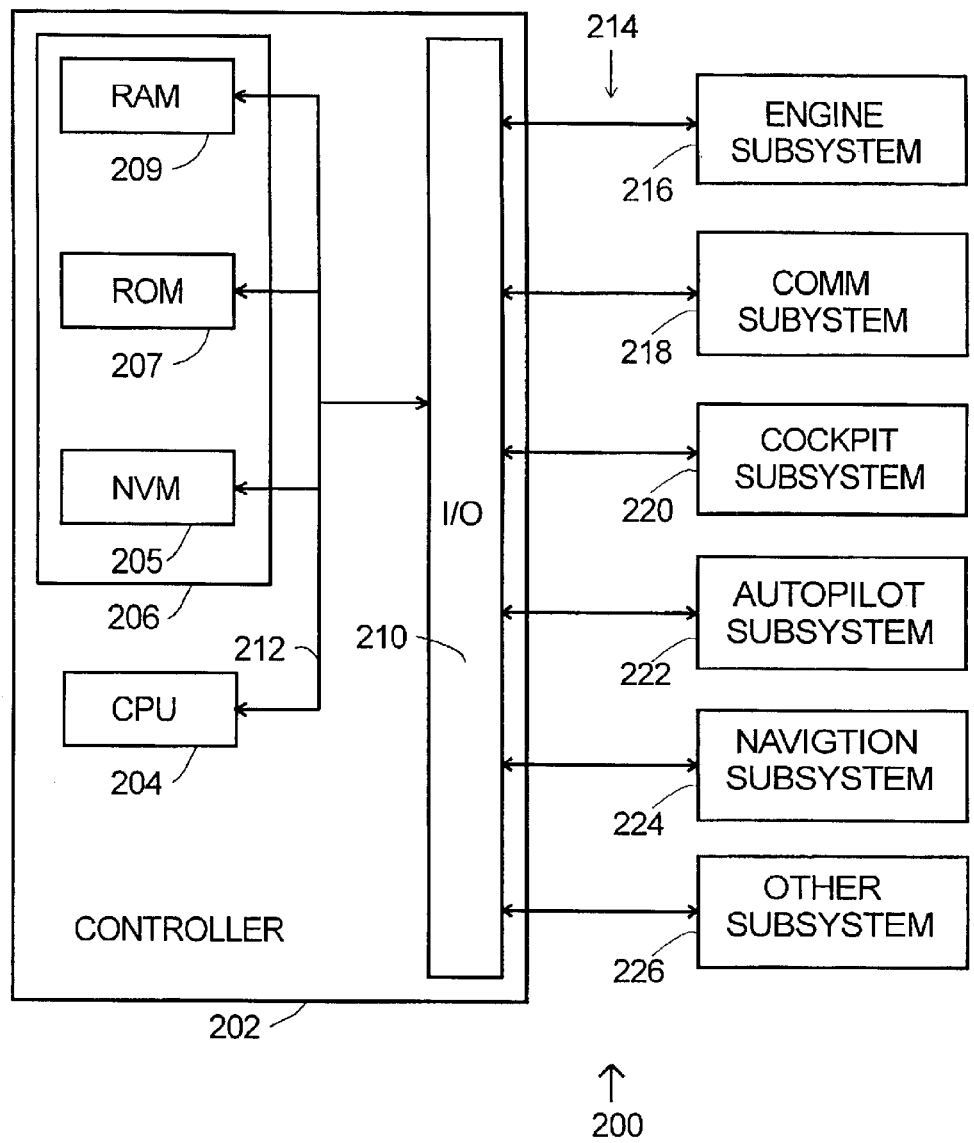
FIG. 7 is a simplified schematic diagram of a Flight Management System for carrying out the method of FIGS. 5–6.

FIG. 7 is a simplified schematic diagram of Flight Management System (FMS) 200 for carrying out the method illustrated in FIGS. 5–6. FMS 200 comprises controller 202 having central processing unit (CPU) 204 and memory 206. Memory 206 usefully includes some or all of non-volatile memory (NVM) 205, read only memory (ROM) 207 and random access or other temporary memory (RAM) 209. CPU 204 and memory 206 are coupled via bus 212 to input-output (I/O) 210 that, in turn, communicates with various subsystems via buses 214. Typical subsystems are engine management subsystem 216, communication subsystem 218, cockpit subsystem 220, autopilot subsystem 222 and navigation subsystem 224. Fewer or additional subsystems 226 may also be present. Cockpit subsystem 220 includes the cockpit displays on which navigation information, aircraft plight parameter information, fuel and engine status and other information are displayed. Such displays are well known in the art. Cockpit subsystem 220 also includes various control panels via which the pilot or navigator may input the "Exit Hold" (EH) command into FMS 200 after having received, for example, an appropriate radio message from air traffic control. Autopilot subsystem 222 controls the flight surface actuators that change the path of the aircraft to follow the navigation directions provided by FMS 200. Navigation subsystem 224 provides current location information to controller 202. While FIG. 7 illustrates a particular architecture suitable for executing the program methods or processes shown in FIGS. 5–6, other FMS architectures can also be used and are intended to be included in the term "flight management system" and abbreviation "FMS" or "FMS 200" used herein.

Computer instructions for program processes 100, 102 (see FIGS. 5–6) usefully reside in memory 206 along with map, waypoint, holding pattern and other information useful for determining the desired flight paths, waypoints, turns and other aircraft maneuvers. As FMS 200 carries out the steps of program processes 100, 102 it uses information from navigation subsystem 224 and route, holding pattern and aircraft performance information stored in memory 206. Such information is conveniently entered by the pilot or navigator via cockpit subsystem 220 and/or obtained from computer media, for example CD ROMs containing such information, or a combination thereof. Computer media readers are conveniently a part of cockpit subsystem 220.

Persons of skill in the art will understand based on the explanation provided herein that FMS 200 can command autopilot subsystem 22 to move the flight control surfaces of the aircraft without direct human intervention to achieve flight along the desired shortened exit pathway. Alternatively, if the autopilot is disengaged, FMS 200 can provide course change directions or suggestions to the pilot via, for example, a display in cockpit subsystem 220, which when followed by the pilot, cause the plane to fly along the desired shortened exit pathway. The present invention is not intended to be limited to a particular method of flying the aircraft and the terms "direct" or "directing" are intended to include issuing autopilot commands or issuing pilot directions and suggestions or a combination thereof or any other means for determining the flight path of the aircraft.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for providing an allowed shortened holding pattern exit path for an aircraft from its current position in a holding pattern to an allowed exit point from the holding pattern wherein the holding pattern comprises inbound and outbound legs, a near turn leading from a first turning point at an inward end of the inbound leg to a second turning point at an inward end of the outbound leg and a far turn leading from a third turning point at an outward end of the outbound leg to a fourth turning point at an outward end of the inbound leg and where the exit point lies on the inbound leg and a symmetrical point lies opposite and symmetrical to the exit point on the outbound leg, the method comprising:
   (a) determining a holding pattern segment A, B, or C on which the aircraft is currently located, that is, on segment A between the third turning point and the exit point or on segment B between the exit point and the symmetrical point or on C between the symmetrical point and the third turning point; and
      (a.1) if on segment A, directing the aircraft along the holding pattern to reach the exit point; or
      (a.2) if on segment B directing the aircraft along the holding pattern to the symmetrical point and at the symmetrical point directing a turn toward the inbound leg to substantially directly reach the exit point; or
      (a.3) if on segment C, determining the shortest distance D along the holding pattern from the symmetrical point to the current position, directing a turn to the inbound leg and continuing along the inbound leg for reciprocal distance –D to reach the exit point; and
   (b) at the exit point directing a turn to the desired departure path.

2. The method of claim 1 further comprising prior to step (a.1), the step of determining whether an "Exit Hold" has occurred, and if the "Exit Hold" has not occurred, repeating this step until the "Exit Hold" has occurred, then proceeding.

3. The method of claim 1 wherein D includes a flight control lag distance.

4. The method of claim 1 wherein segment B includes a linear extension of the outbound leg, extending in an inbound direction from the second turning point.

5. The method of claim 1 further comprising prior to step (a), the steps of:
   (1) determining whether the aircraft is on an entry path into the holding pattern or already in the holding pattern, and;
   (2) if on an entry path into the holding pattern, then first executing steps (2.1)–(2.3), otherwise skipping steps (2.1)–(2.3);
      (2.1) determining a first tangent point where the path of the entering aircraft tangentially intersect a first circle, the first circle being tangent to the outbound leg at a second tangent point;
      (2.2) at the first tangent point, directing a turn onto the first circle toward the outbound leg of the holding pattern;
      (2.3) at the second tangent point directing a roll-out onto the outbound leg of the holding pattern thereby arriving in the holding pattern; and
      (2.4) proceeding to step (a).

6. The method of claim 5 further comprising prior to step (2.1), determining whether the entry path is a Type I or a Type II entry path and if a Type I entry path executing steps (2.1)–(2.3) wherein the first and second tangent points are for the Type I entry and the second tangent point may lie on an extension of the outbound leg, such location being considered within segment B for determining a shortened holding pattern exit path, or if a Type II entry path, executing steps (2.1)–(2.3) wherein the first and second tangent points are for the Type II entry, and the second tangent point is considered as being within segment B for purposes of determining a shortened holding pattern exit path, and then proceeding to step (2.4).

7. An apparatus for directing an aircraft on an allowed shortened holding pattern exit path from its current position in a holding pattern to an allowed exit point from the holding pattern wherein the holding pattern comprises inbound and outbound legs, a near tun leading from a first turning point at an inward end of the inbound leg to a second turning point at an inward end of the outbound leg and a far turn leading from a third tuning point at an outward end of the outbound leg to a four turning point at an outward end of the inbound leg and where the lies on the inbound leg and a symmetrical point lies opposite and symmetrical to the on the outbound leg, comprising:
  (1) a processor;
  (2) memory coupled to the processor;
  (3) a display unit coupled to the process for indicating suggested course changes or an autopilot coupled to the processor for actuating aircraft control surfaces to produce course changes or both;
  (4) a program residing in memory and being executed by the processor for directing course changes on the display or to the autopilot or both, the program comprising:
    (4.a) determining a holding pattern segment A, B, or C on which the aircraft is currently located, that is, on segment A between the third turning point and the exit point or on segment B between the exit point and the symmetrical point or on C between the symmetrical point and the third turning point; and
      (4.a.1) if on segment A, directing the aircraft along the holding pattern to reach the exit point; or
      (4.a.2) if on segment B directing the aircraft along the bolding pattern to the symmetrical point and at the symmetrical point directing a turn toward the inbound leg to substantially directly reach the exit point; or
      (4.a.3) if on segment C, determining the shortest distance D along the holding pattern from the symmetrical point to the current position directing a turn to the inbound leg and continuing along the inbound leg for reciprocal distance –D to reach the exit point; and
    (4.b) at the exit point directing a turn to the desired departure path.

8. The apparatus of claim 7 wherein the program residing in memory further comprises prior to step (4.a.1), the step of determining whether an "Exit Hold" has occurred, and if the "Exit Hold" has not occurred, repeating this step until the "Exit Hold" has occurred, then proceeding.

9. The apparatus of claim 7 wherein D includes a flight control lag distance determined by the processor using aircraft performance data stored in the memory.

10. The apparatus of claim 7 wherein segment B includes a linear extension of the outbound leg, extending in an inbound direction from the second turning point.

11. The apparatus of claim 7 wherein the program residing in memory further comprising prior to step (4.a), the steps of:
  (i) determining whether the aircraft is on an entry path into the holding pattern or already in the holding pattern, and;
  (ii) if on an entry path into the holding pattern, then first executing steps (ii.1)–(ii.3); otherwise slipping steps (ii.1)–(ii.3);
    (ii.1) determining a first tangent point where the path of the entering aircraft tangentially intersects a first circle, the first circle being tangent to the outbound leg at a second tangent point;
    (ii.2) at the first tangent point, directing a turn onto the first circle toward the outbound leg of the holding pattern;
    (ii.3) at the second tangent point, directing a roll-out onto the outbound leg of the holding pattern thereby arriving in the holding pattern; and
  (iii) proceeding to step (4.a).

12. The apparatus of claim 11 wherein the program residing in memory further comprises prior to step (ii.1) determining whether the entry path is a Type I or a Type II entry path and if a Type I entry path executing steps (ii.1)–(ii.3) wherein the first and second tangent points are for the Type I entry and the second tangent point may lie on an inward extension of the outbound leg, such location being considered within segment B for determining a shortened holding pattern exit path, or if a Type II entry path, executing steps (ii.1) –(ii.3) wherein the first and second tangent points are for the Type II entry, and the second tangent point is considered as being within segment B for purposes of determining a shortened holding pattern exit path, and then proceeding to step (iii).

13. A computer-readable medium encoded with a computer program comprising:
  (1) a program for providing an allowed shortened holding pattern exit path for an aircraft from its current position in a holding pattern to an allowed exit point from the holding pattern wherein the holding pattern comprises inbound and outbound legs, a near turn leading from a first turning point at an inward end of the inbound leg to a second turning point at an inward end of the outbound leg and a far turn leading from a third turning point at an outward end of the outbound leg to a fourth turning point at an outward end of the inbound leg and where the exit point lies on the inbound leg and a symmetrical point lies opposite and symmetrical to the exit point on the outbound leg, the method comprising:
    (1.a) determining the holding pattern segment A, B, or C on which the aircraft is currently located, that is, on segment A between the third turning point and the exit point or on segment B between the exit point and the symmetrical point or on C between the symmetrical point and the third turning point; and
      (1.a.1) if on segment A, directing the aircraft along the holding pattern to reach the exit point; or
      (1.a.2) if on segment B directing the aircraft along the holding pattern to the symmetrical point and at the symmetrical point directing a turn toward the inbound leg to substantially directly reach the exit point; or
      (1.a.3) if on segment C, determining the shortest distance D along the holding pattern from the symmetrical point to the current position, directing a turn to the inbound leg and continuing along the inbound leg for reciprocal distance –D to reach the exit point; and (1.b) at the exit point directing a turn to the desired departure path; and (2) signal bearing media bearing said program.

14. The computer-readable medium encoded with a computer program of claim 13 further comprising prior to step (1.a.1), the step of determining whether an "Exit Hold" has occurred, and if the "Exit Hold" has not occurred, repeating this step until the "Exit Hold" has occurred, then proceeding.

15. The computer-readable medium encoded with a computer program of claim 13 wherein D includes a flight control lag distance.

16. The computer-readable medium encoded with a computer program of claim 13 wherein segment B includes a linear extension of the outbound leg, extending in an inbound direction from the second turning point.

17. The computer-readable medium encoded with a computer program of claim 13 further comprising prior to program step (1.a), the steps of:

(1) determining whether the aircraft is on an entry path into the holding pattern or already in the holding pattern, and;

(2) if on an entry path into the holding pattern, then first executing steps (2.1)–(2.3), otherwise skipping steps (2.1)–(2.3);

(2.1) determining a first tangent point where the path of the entering aircraft tangentially intersects a first circle, the first circle being tangent to the outbound leg at a second tangent point, (2.2) at the first tangent point, directing a turn onto the first circle toward the outbound leg of the holding pattern;

(2.3) at the second tangent point directing a roll-out onto the outbound leg of the holding pattern thereby arriving in the holding pattern; and (2.4) proceeding to step (1.a).

18. The computer-readable medium encoded with a computer program of claim 17 wherein the program further comprises prior to step (2.1) determining whether the entry path is a Type I or a Type II entry path and if a Type I entry path executing steps (2.1)–(2.3) wherein the first and second tangent points are for the Type I entry and the second tangent point may lie on an extension of the outbound leg, such location being considered within segment B for determining a shortened holding pattern exit path, or if a Type II entry path, executing steps (2.1)–(2.3) wherein the first and second tangent points are for the Type II entry, and the second tangent point is considered as being within segment B for purposes of determining a shortened holding pattern exit path, and then proceeding to step (1.a).

* * * * *